(12) United States Patent
Nagamura

(10) Patent No.: US 7,457,225 B2
(45) Date of Patent: Nov. 25, 2008

(54) APPARATUS AND METHOD FOR RECORDING DATA IN OPTICAL RECORDING MEDIUM

(75) Inventor: Aritsune Nagamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 773 days.

(21) Appl. No.: 10/994,478

(22) Filed: Nov. 23, 2004

(65) Prior Publication Data

US 2005/0174912 A1    Aug. 11, 2005

(30) Foreign Application Priority Data

Nov. 26, 2003  (JP) .............................. 2003-395916
Dec. 4, 2003   (JP) .............................. 2003-406337

(51) Int. Cl.
*G11B 7/00* (2006.01)

(52) U.S. Cl. .................................................. 369/116

(58) Field of Classification Search ........................ None
See application file for complete search history.

(56) References Cited

U.S. PATENT DOCUMENTS

| 4,733,398 | A  | * | 3/1988  | Shibagaki et al. ............. 372/31 |
| 5,852,596 | A  | * | 12/1998 | Kurita et al. ............. 369/53.18 |
| 6,735,546 | B2 | * | 5/2004  | Scheuerlein ................ 702/132 |
| 2005/0069002 | A1 | * | 3/2005 | Senga et al. ............. 372/38.01 |

FOREIGN PATENT DOCUMENTS

| JP | 2002-216349 | 8/2002 |
| JP | 2003-272150 | 9/2003 |

\* cited by examiner

*Primary Examiner*—Joseph Feild
*Assistant Examiner*—Peter Vincent Agustin
(74) *Attorney, Agent, or Firm*—Dickstein Shapiro LLP

(57) ABSTRACT

An optical data recording method for recording data in a phase-change optical recording medium using a sequence of one or more short pulses is provided. In this method, a temperature is detected at a prescribed spot around the optical recording medium. The amplitude of the short pulses is controlled in response to the detected temperature. Then, data are recorded in the optical recording medium using the sequence of amplitude-controlled short pulses.

10 Claims, 8 Drawing Sheets

FIG.10

| OPTICAL DISK DRIVE NO. | SURROUNDING TEMPERATURE | BOTTOM OF OPTICAL DISK DRIVE | DISK SURFACE | TOP OF OPTICAL DISK DRIVE | THERMISTOR |
|---|---|---|---|---|---|
| 1 | 49.9 | 74 | 64.8 | 63.1 | 65.4 |
| 2 | 50.9 | 73.2 | 64.9 | 63.3 | 67.1 |
| 3 | 50.8 | 72.6 | 65.7 | 63.6 | 64.7 |
| 4 | 51.1 | 71.1 | 63.1 | 61.8 | 63.6 |
| 5 | 51.2 | 74.2 | 65.7 | 64.2 | 64 |

APPARATUS AND METHOD FOR RECORDING DATA IN OPTICAL RECORDING MEDIUM

BACKGROUND OF THE INVENTION

1. Field of the Invention

The present invention generally relates to optical recording for writing data in a phase-change optical recording medium using a sequence of recording pulses, and more particularly, to a pulse control technique for controlling the amplitude of the recording pulses when writing data in an optical disk.

2. Description of Related Art

JP 2002-216349A discloses a technique for selecting the optimum waveform of a laser pulse in response to change in the surrounding temperature, when recording data in an organic dye recording layer of an optical disk (such as DVD-R). It is pointed out in this publication that variation in wavelength is one of the factors that cause degradation of the recording quality. Variation in wavelength is detected indirectly by measuring the temperature surrounding the laser, and the optimum shape of the recording pulse is selected based on the measurement result.

In recent years and continuing, various types of optical disks are put into practical use, along with the active progress of optical technique. Examples of such optical disks include read-only optical disks (such as music CDs or CD-ROMs), writable disks using dye media, and rewritable disks (such as CD-RW) using phase-change recording media. In addition, large capacity optical disks, such as DVD-ROMs (digital versatile disks-read only memories), DVD+R, and DVD+RW, are also attracting attention. These large capacity optical disks have been realized owing to miniaturization of the spot diameter by shortening the wavelength of the semiconductor laser and employment of a high-NA objective lens.

To record data in any type of optical disk, an optical recording/reproducing apparatus with an optical pickup is used. In general, a semiconductor laser is employed as the light source in the optical pickup system. For example, in single-pulse optical recording, a modulated emission waveform is used to record data in phase-change media. The modulated emission waveform is generated using eight-to-fourteen modulation (EFM) codes or eight-to-sixteen (8-16) modulation codes.

However, with the single-pulse optical recording techniques, recording marks are likely to deform into tear-drops due to heat accumulation, and subsequent phase change to the amorphous state cannot be accomplished satisfactorily due to insufficient cooling rate. Thus, recording marks with low reflectance with respect to laser light cannot be acquired when using the single-pulse recording scheme. To overcome this problem, a multipulse recording scheme for recording data in phase change recording media using a sequence of pulse consisting of one or more short pulses is employed. The pulse emission rule, including the pulse width and the amplitude of the sequence of short pulses, is called a strategy. The strategy is determined such that the sequence of optical emission can produce a mark consistent with the modulated emission waveform generated based on EFM codes or 8-16 modulation codes. A sequence of pulses includes a front pulse (FP) for sufficiently heating the recording layer of a phase change recording medium at or above the melting point in advance, a last pulse (LP) of the heating cycle, multiple heating pulses (ML) successively generated between the front pulse and the last pulse, and a cooling pulse (CP) following the last pulse. The last pulse (LP) and the multiple pulses (ML) may be set to zero depending on the mark length. For instance, LP and MP are not used when recording 3T marks.

Using the multipulse emission waveform, mark regions of a phase change recording medium can change to the amorphous state under the rapid cooling condition, with prompt change from the heating state to the cooling state using a group of heating pulses FP, MP and LP and a cooling pulse CP. In the space regions, the crystalline phase is produced under the slow cooling condition using erase pulses, and therefore, adequate reflectance difference is acquired between amorphous phase and crystalline phase.

The recording characteristics of the phase change optical disk include, for example, jitter in the reproduction signals, overwrite capabilities, and power margins. These parameters vary depending on the pulse widths of the heating pulses (FP, MP, and LP) and the cooling pulse (CP), the recording power (emission power), the type and linear velocity of the optical disk, the surrounding temperature, etc.

In conjunction with the dependency of the recording characteristics, the above-described publication JP 2002-216349A tries to detect fluctuation in wavelength by measuring the surrounding temperature of the laser and to select the optimum recording pulse based on the measurement result for an organic dye recording medium, such as DVD-R.

This technique is designed for organic dye optical disks, in which recording marks are formed in an organic dye recording layer based on the heating duty of laser pulses, and accordingly, it cannot be applied as it is to phase-change type optical disks because in phase-change optical disks recording marks are formed by rapid phase transition to amorphous state under rapid heating and cooling processes.

Formation of the amorphous phase under rapid heating and cooling conditions is affected by change in the surrounding temperature. If the temperature surrounding the optical disk rises to be high, the recording layer is heated too much during the rapid heating process, while the cooling rate becomes insufficient in the rapid cooling process. Consequently, the recording quality is degraded.

Optical disk recording and reproducing equipment is generally assembled into a personal computer. Due to the high-speed operations and multi-function configuration of recent personal computers, the amount of heat generated by various components is increasing inside the personal computer, and the environmental temperature of the personal computer inevitably rises. Internal temperature rise is especially conspicuous in highly integrated notebook computers. If the recording strategies optimized for room temperature are applied to the high temperature environment, such as inside personal computers, the recording quality designed to be achievable at room temperature cannot be acquired.

SUMMARY OF THE INVENTION

Therefore, it is an object of the present invention to improve the recording quality of phase-change optical recording media under high-temperature environments.

To achieve the object, in one aspect of the invention, an optical data recording apparatus includes a pulse generator configured to generate a sequence of one or more short pulses used to record data in a phase-change optical recording medium, a temperature sensor configured to detect a temperature at a prescribed spot of the optical data recording apparatus, and a pulse amplitude controller configured to control the amplitude of said short pulses based on the detected temperature.

In another aspect of the invention, an optical data recording method for recording data in a phase-change optical recording medium using a sequence of one or more short pulses is provided. The method includes the steps of:

(a) detecting a temperature at a prescribed spot near the optical recording medium;
(b) controlling an amplitude of the short pulses in response to the detected temperature; and
(c) recording data in the optical recording medium using the sequence of the amplitude-controlled short pulses.

With the method and the apparatus, the amplitude of short pulses defining a pulse sequence is controlled in response to the temperature change occurring near the phase-change optical recording medium. Consequently, the recording quality is improved even under a high-temperature environment, such as inside a personal computer. Since need for a heat releasing fin to be used in the optical recording and reproducing apparatus is eliminated, the optical recording and reproducing apparatus can be made compact and light. In addition, and the manufacturing cost can be reduced.

BRIEF DESCRIPTION OF THE DRAWINGS

Other objects, features, and advantages of the present invention will become more apparent from the following detailed description when read in conjunction with the accompanying drawings, in which:

FIG. 10 is a table showing the temperature measurement results at various spots in the optical disk recording and reproducing apparatus.

DETAILED DESCRIPTION OF THE PREFERRED EMBODIMENT

The preferred embodiment of the present invention is now explained below in conjunction with attached drawings.

Figure 1:
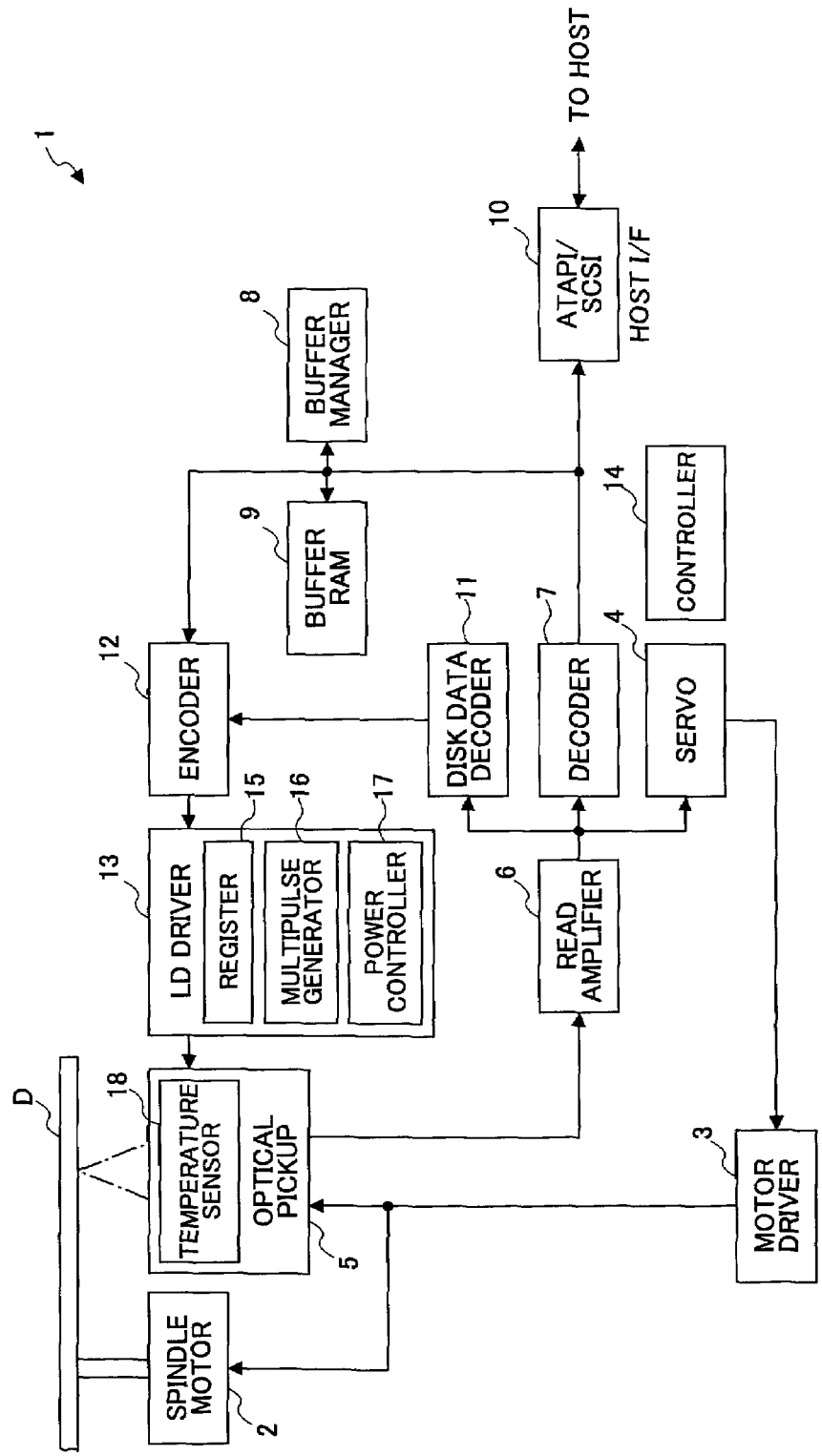
FIG. 1 is a block diagram illustrating the structure of an optical disk recording and reproducing apparatus according to an embodiment of the invention.

FIG. 1 is a block diagram illustrating the structure of an optical disk recording and reproducing apparatus 1 according to an embodiment of the invention. The optical disk recording and reproducing apparatus 1 includes a spindle motor 2 for rotating an optical disk D, servo means 4, an optical pickup 5, a read amplifier 6, a decoder 7, a buffer manager 8, a buffer RAM 9, a host interface 10, a disk data decoder 11, an encoder 12, an LD driver 13, and a controller 14. The LD driver 13 includes a register 15, a multipulse generator 16, and a power controller 17. The arrows connecting these components in FIG. 1 indicate data flow, and physical connection between the controller 14 and each clock is omitted for the purpose of simplification.

Although not shown in FIG. 1, the optical pickup 5 includes a laser diode (LD) functioning as the light source, an optical system, a photodetector formed by a light-receiving element, a focus actuator, a track actuator, a seek actuator, and a position sensor. The optical system includes an objective lens for guiding a laser beam emitted from the laser diode onto the recording face of the optical disk D. The optical system also guides the return light reflected from the recording face to the photodetector positioned at a prescribed position.

The optical pickup 5 has a temperature sensor 18 for sensing the internal temperature. The temperature sensor 18 is, for example, a thermistor. Electric current flowing in the thermistor changes in response to change of the resistance of the thermistor. The controller 14 detects change in the electric current, and estimates the internal temperature based on the correlation between the electric current and temperature. The internal temperature of the optical pickup 5 is treated as the surrounding temperature of the optical disk D, which is substantially the same as the temperature of the surface of the optical disk recording and reproducing apparatus 1 and as the surface temperature of the optical disk D. This is explained below with reference to FIG. 10. In the embodiment, the internal temperature of the optical pickup 5 is equivalent to the surface temperature of the optical disk recording and reproducing apparatus 1, which temperature is accordingly treated as the surrounding temperature of the optical disk D.

The optical pickup 5 is moved in the direction of the sledge, that is, in the radial direction of the optical disk D, by the seek motor. The focus actuator, the track actuator, and the seek motor (which are not shown) are controlled by the motor driver 3 and the servo means 4, based on the signal acquired by the above-described photodetector and a position sensor (which are also not shown in FIG. 1), such that the light spot of the laser beam is located at the target position on the optical disk D. The controller 14 comprises a microcomputer, and carries out central control of the overall operations of the optical disk recording and reproducing apparatus 1.

In the optical disk recording and reproducing apparatus 1, the optical disk D is rotated by the spindle motor 2. The rotation of the spindle motor 2 is controlled by the motor driver 3 and the servo means 4 such that the optical disk D is rotated at constant linear velocity (CLV) or constant angular velocity (CAV). In the optical pickup 5, the laser beam emitted by the laser diode is collected and focused by the objective lens onto the recording face of the optical disk D. The servo means 4 controls the actuators to perform focus servo and track servo in order to reproduce and write data from and in the optical disk D.

In reproducing data from the optical disk D, the reproduction signal acquired by the optical pickup 5 is amplified and binarized by the read amplifier 6. Then, deinterleaving and error correction are performed by the decoder 7. The decoded data are temporarily stored in the buffer RAM 9 by the buffer manager 8. When a certain amount of decoded data is accumulated as sector data in the buffer RAM 9, the sector data are transmitted via the host interface 10 to, for example, a personal computer. The host interface 10 is a standardized bi-directional communication interface, such as ATAPI or SCSI.

In the recording operation, the data supplied from the host via the host interface 10 is temporarily stored in the buffer RAM 9 by the buffer manager 8. Prior to starting the data recording, optimum power calibration is carried out using a test writing area called a power calibration area (PCA) to determine the optimum recording power. Also, the laser spot is brought to the writing start position. In DVD+RW, the writing start position is determined in advance based on the wobble signals acquired from the wobble grooves delineated on the optical disk D. The writing start position may be determined from information recorded as land prepits in DVD-RW and DVD-RAM.

Wobble signals contain address information called "address in pre-groove (ADIP)", and this address information is extracted by the disk data decoder 11, The disk data decoder 11 also generates a sync signal, which signal is input to the encoder 12 to allow data to be written accurately in the correct position on the optical disk D.

The LD driver 13 receives a record channel clock and EFM data generated by the EFM modulation scheme from the encoder 12 under the control of the controller 14. The clock and the EFM data are temporarily stored as pulse information in the register 15. The multipulse generator 16 of the LD driver 13 generates multiple pulses (that is, a sequence of recording pulses) from the pulse information stored in the register 15. The power controller 17 controls the output power of the laser beam emitted from the laser diode arranged in the optical pickup 5, using power information stored in the register 15, to generate an LD emission waveform based on the recording pulse sequence.

Figure 2:
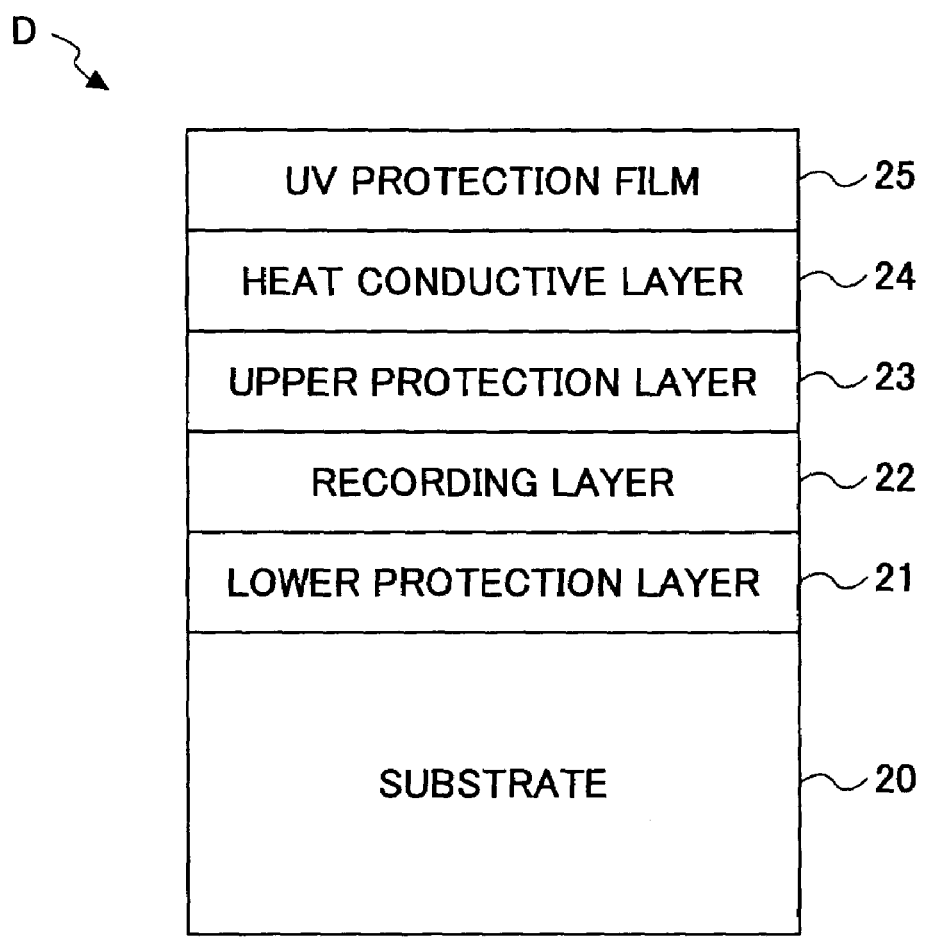
FIG. 2 is a cross-sectional view illustrating the layered structure of an optical disk.

FIG. 2 is a cross-sectional view of an optical disk D used in the embodiment. The optical disk D has a lower protection layer 21, a recording layer 22, an upper protection layer 23, a heat conductive layer 24, and a UV protection layer 25 deposited in this order on a transparent substrate 20.

The transparent substrate 20 is made of, for example, polycarbonate with index of refraction of 1.58. The lower protection layer 21 has a thickness of 17 nm and is made of, for example, ZnS or SiO2. The recording layer 22 has a thickness of 20 nm and is made of, for example, Ag(2)In(10)Sb(28)Te(60). The upper protection layer 23 has a thickness of 25 nm and is made of, for example, ZnS or SiO2 having an index of refraction of 2.1. The heat conductive layer 24 has a thickness of 100 nm and is made of, for example, an aluminum alloy (such as Al—Ti 1 wt % alloy) The UV protection layer 25 is placed on the top of the layer structure, and is made of a UV-cured resin.

In this embodiment, a DVD+RW with the recording rate of 2.4× is used as the optical disk D; however, the invention is not limited to this example. For example, CD-RW, DVD-RW, and DVD-RAM may be used as the optical disk D.

In phase-change optical disks, the recording quality generally varies depending on the direct overwrite (DOW) capability, the pulse width of heating pulses, the pulse width of cooling pulses, recording power, the type and the linear velocity of the optical disk, and the surrounding temperature of the optical disk. In this embodiment, jitter indicating signal variation from the ideal clock is used as the index representing the recording quality. In general, it is determined that the recording quality is satisfactory if the jitter value is lower than 9%.

In general, optical disk recording and reproducing apparatuses are attached to personal computers, and recent high-speed multi-function personal computers have a problem of increasing heat generation from the inner components. This means that the environmental temperature surrounding the optical disk recording and reproducing apparatus tends to rise. Especially, a highly integrated notebook computer is not furnished with a sufficient heat transfer mechanism, and the internal temperature rise becomes more conspicuous. If recording operation is carried out using the recording strategy optimized at for room temperature in the high temperature environment, the designed recording quality may not be achieved.

In this embodiment, a DVD+RW with a recording rate of 2.4× is used as a typical phase-change optical disk D. Of course, the present invention is applied to arbitrary phase-change recording media, including CD-RW, DVD-RW, and DVD-RAM.

Figure 3:
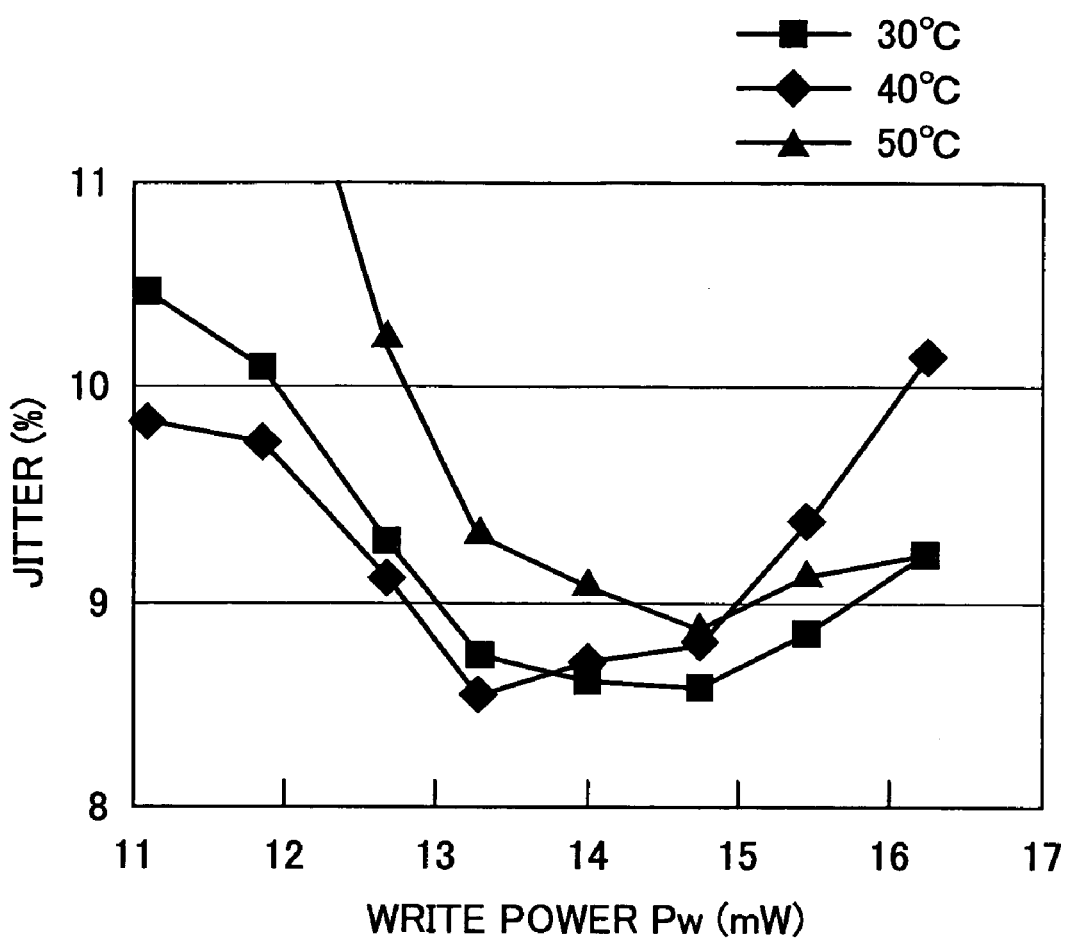
FIG. 3 is a graph of jitter as a function of write power at temperatures of 30° C., 40° C. and 50° C.

FIG. 3 is a graph of jitter [%] as a function of write power Pw [mW] obtained by overwriting recording data at several temperatures using the recording strategy optimized for room temperature. This graph shows how the recording quality varies as the surface temperature of the optical disk recording and reproducing apparatus changes from room temperature (set to 30° C. for convenience sake) to 40° C. and 50° C.

Although actual measurement was not conducted above 50° C. because of operating limit of the optical disk recording and reproducing apparatus 1, the present invention is applicable to an environment over 50° C. In the following description, the term "temperature" means one measured at the surface of the optical disk recording and reproducing apparatus (or the optical disk drive) 1. In the measurement shown in FIG. 3, optical recording is carried out, while changing the write power, at the direct overwrite (DOW) cycle of 30 (DOW=30). The jitter bottom value becomes the minimum when the temperature is 30° C., and it gradually increases as the temperature rises to 40° C. and to 50° C. To be more precise, the jitter bottom value increases from 8.5% to 9% when the temperature rises from 30° C. to 50° C. In addition, as the temperature rises, the write power required to bring the jitter to the bottom value shifts to the higher side. It is considered that, at the same write power, the phase-change recording medium cannot be cooled sufficiently if the environmental temperature is high. By increasing the write power, the recording layer of the phase-change recording medium is heated more rapidly, and accordingly, sufficiently rapid cooling required for phase transition to the amorphous state can be achieved even at a higher environmental temperature. From the measurement result, it is expected that the recording quality can be maintained high even in notebook computers with higher internal temperatures, by changing the recording strategy depending on the environmental temperature.

In the embodiment, mark edge recording is carried out using EFM modulation codes as the data modulation scheme. The data lengths of the mark and space are set to 3T to 14T (where T denotes a period of the channel clock). In the recording strategy, the number of pulses used to form each mark is defined as N−2, where N is an integer greater than or equal to 1 representing the data length.

Figure 4:
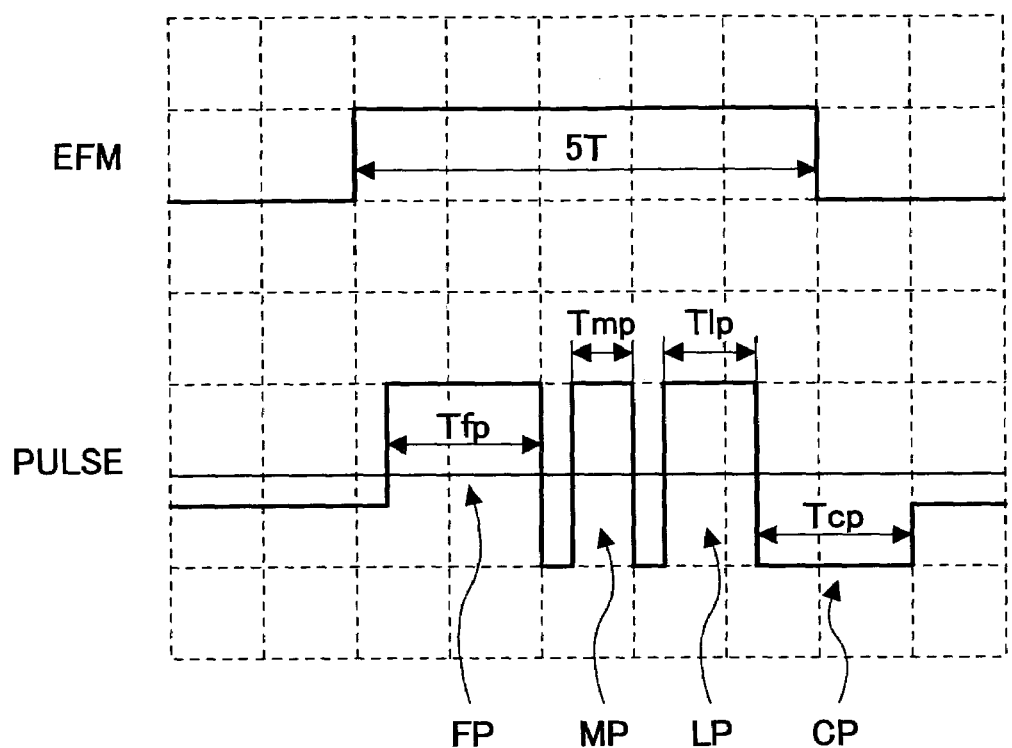
FIG. 4 is an example of a sequence of short pulses used for writing 5T data.

FIG. 4 is an example of a sequence of short pulses for recording a 5T mark. The pulse sequence includes a front heating pulse (FP) for preheating the recording layer of the phase-change recording medium at or above the melting point, a last heating pulse (LP), one or more successive pulses (MP: multi-pulse) inserted between FP and LP, and a cooling pulse (CP) following LP. Depending on the mark length, any one of FP, MP, LP, and CP may be omitted, or the pulse width of such an unused pulse may be set to zero. The sequence of pulses FP-MP-LP-CP is called a short pulse group. A mark having a length ranging from 3T to 14T is formed using a combination of FP, MP, LP and CP. The optical disk recording and reproducing apparatus 1 performs continuous recording using successively generated short pulses groups.

A power level for erasing the mark, which is set lower than the write power Pw, is called erase power Pe. Using the ease power Pe, the recording layer is gradually heated and cooled to cause phase change to the non-amorphous state. The ratio of erase power Pe to write power Pw (that is, the ratio of the erasing pulse amplitude to the recording pulse amplitude) is denoted as $\epsilon$. The value of $\epsilon$ greatly affects the recording quality and the direct overwrite (DOW) tolerance.

Therefore, in the embodiment, the $\epsilon$ value is controlled based on the environmental temperature surrounding the optical disk D (more particularly, on the temperature of the surface of the optical recording/reproducing apparatus accommodating the optical disk D) so as to improve the recording quality. In this context, the optical disk is a phase-change optical recording medium. To confirm the realization of this concept, it is tested how the optimization of the $\epsilon$ value in response to the temperature change on the surface of the optical disk recording/reproducing apparatus 1 contributes to the improvement of the recording quality especially in the high-temperature recording environment. Prior to the test, the $\epsilon$ value is optimized in advance such that the recording quality becomes the best at room temperature (30° C.). It is empirically known that the $\epsilon$ value gives great influence on the recording quality and the DOW tolerance. Accordingly, in the embodiment, the $\epsilon$ value is increased by 3% at a higher temperature, as compared to the room temperature.

In estimating the recording quality, DOW 1 and the subsequent repetitions of direct overwrite (DOW) are important. When manufacturing a phase-change optical disk in a factory, the recording layer of the optical disk is initially crystallized uniformly at an erase power, and the initial writing is conducted in the uniformly crystallized recording layer. This initial direct overwrite is referred to as DOW 0, and the recording quality at DOW 0 is satisfactory. When another writing operation is conducted in the shipped optical disk using an optical disk recording and reproducing apparatus, the initial writing region written in the factory and the user writing region written by the optical recording/reproducing apparatus coexist in the optical disk. The first direct overwrite (DOW) cycle by the optical recording/reproducing apparatus is referred to as DOW 1. Since the recording conditions of the optical recording/reproducing apparatus differ from those in the factory, the recording quality of DOW 1 is degraded. In the test, the recording quality is examined at DOW 1 and DOW 30.

In the embodiment, jitter level is employed as the index indicating the recording quality. The lower the jitter level, the higher the recording quality. In the general standard, jitter level below 9% is the acceptable recording quality. Due to variation in the components of the optical recoding/reproducing apparatus, variation in phase-change optical disk, and many other factors, the level of the recording power fluctuates. Consequently, it is desirable for the recording quality that the range of power (i.e., the power margin) in which the jitter level is kept below 9% be broader. With a broader power margin, the recording quality is improved.

Figure 5:
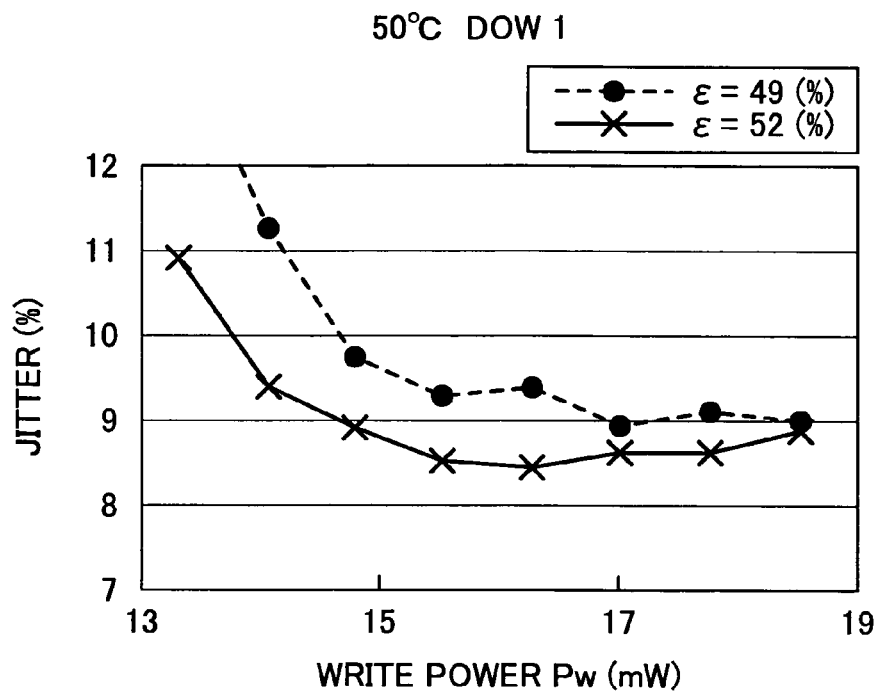
FIG. 5 is a graph of jitter as a function of write power Pw at DOW 1.
Figure 6:
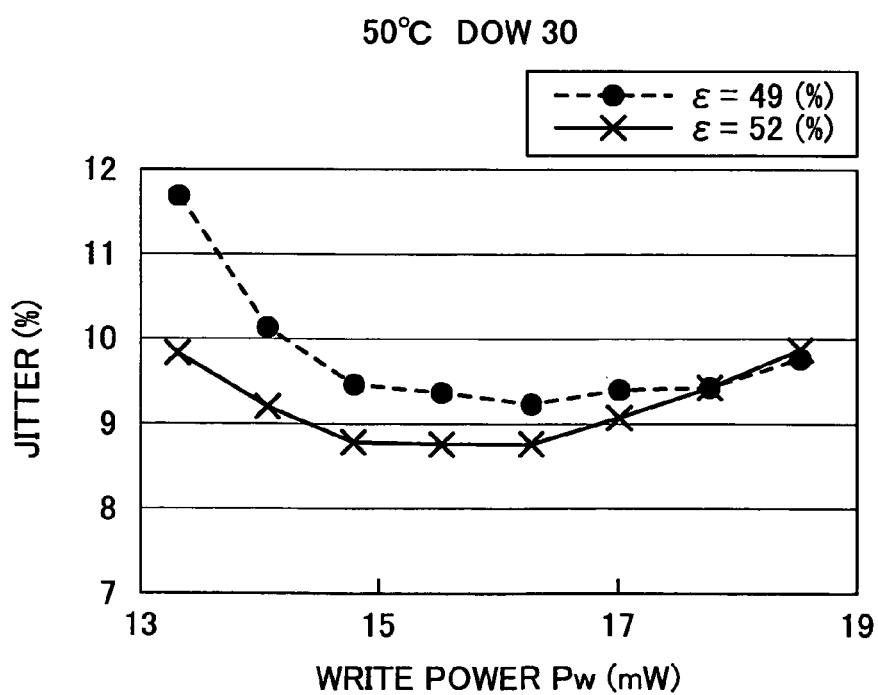
FIG. 6 is a graph of jitter as a function of write power Pw at DOW 30.

FIG. 5 and FIG. 6 are graphs of jitter level as a function of write power Pw at DOW 1 and DOW 30, respectively, showing the comparison between the E value of 49% (0.49) and 52% (0.52). The $\epsilon$ value of 49% is the optimum condition at room temperature, and the $\epsilon$ value is raised to 52% by adjusting the erase power Pe. As is clearly understood from FIG. 5 and FIG. 6, the jitter bottom is lower when $\epsilon$ is set to 52%, rather than set to 49%, and that a more satisfactory recording quality is achieved by adjusting the $\epsilon$ value.

Figure 7:
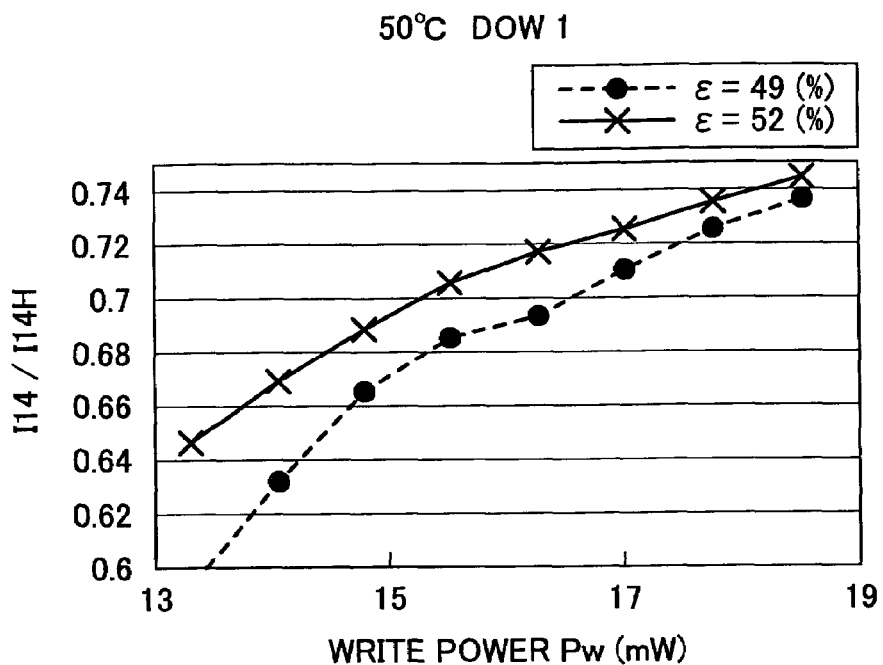
FIG. 7 is a graph of I14-to-I14H ratio as a function of write power Pw at DOW 1.
Figure 8:
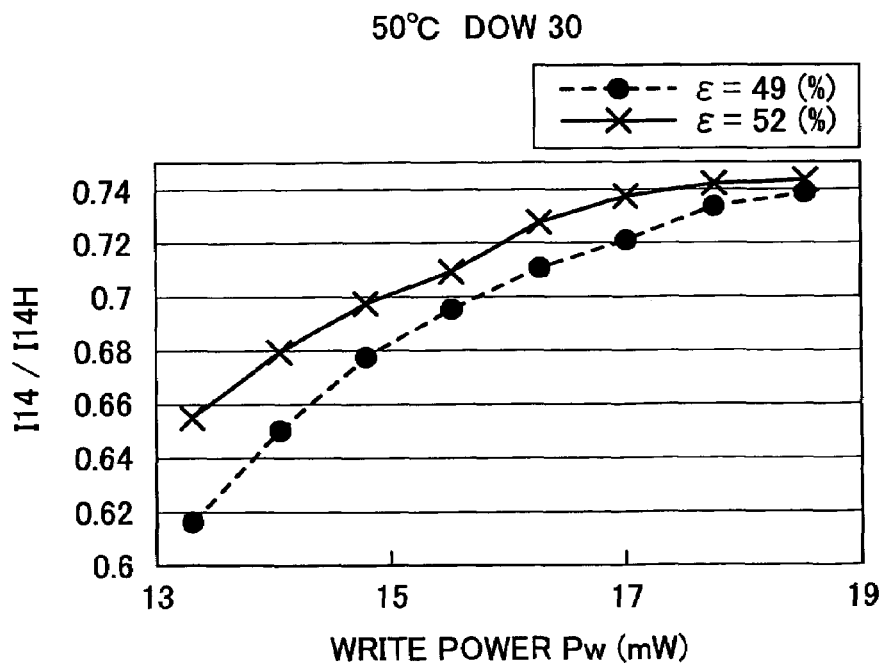
FIG. 8 is a graph of I14-to-I14H ratio as a function of write power Pw at DOW 30.

FIG. 7 and FIG. 8 are graphs of I14/I14H as a function of write power Pw at DOW 1 and DOW 30, respectively. These graphs corresponds to those of FIG. 5 and FIG. 6. The ratio I14/I14H is a ratio of the modulation amplitude of the reproduced signal waveform to the peak level. As I14/I14H increases, the amplitude of the reproduced signal is greater, and less signal amplification by the signal amplifier of the optical disk recording/reproducing apparatus is required. Accordingly, the noise component applied to the signal amplification is reduced, and higher recording quality is achieved.

Assuming that the $\epsilon$ value at room temperature (30° C. in this example) is $\epsilon$ 0, then the value of $\epsilon$ 0 is set to 49% in the above-described embodiment. If the $\epsilon$ value at a temperature higher than a prescribed temperature Tth (for example, 40° C.) is $\epsilon$ H, $\epsilon$ H is 52% at 50° C. in the above-described embodiment. In this case, $\epsilon$ H is nearly equal to 1.06*$\epsilon$ 0. Taking into account change in the optimum $\epsilon$ H due to variation in the optical disk D, it is desired that $\epsilon$ H be set so as to satisfy the condition $\epsilon$ 0<$\epsilon$ H<1.15*$\epsilon$ 0. In this manner, by increasing the $\epsilon$ value at higher temperatures, the recording quality is improved.

Figure 9:
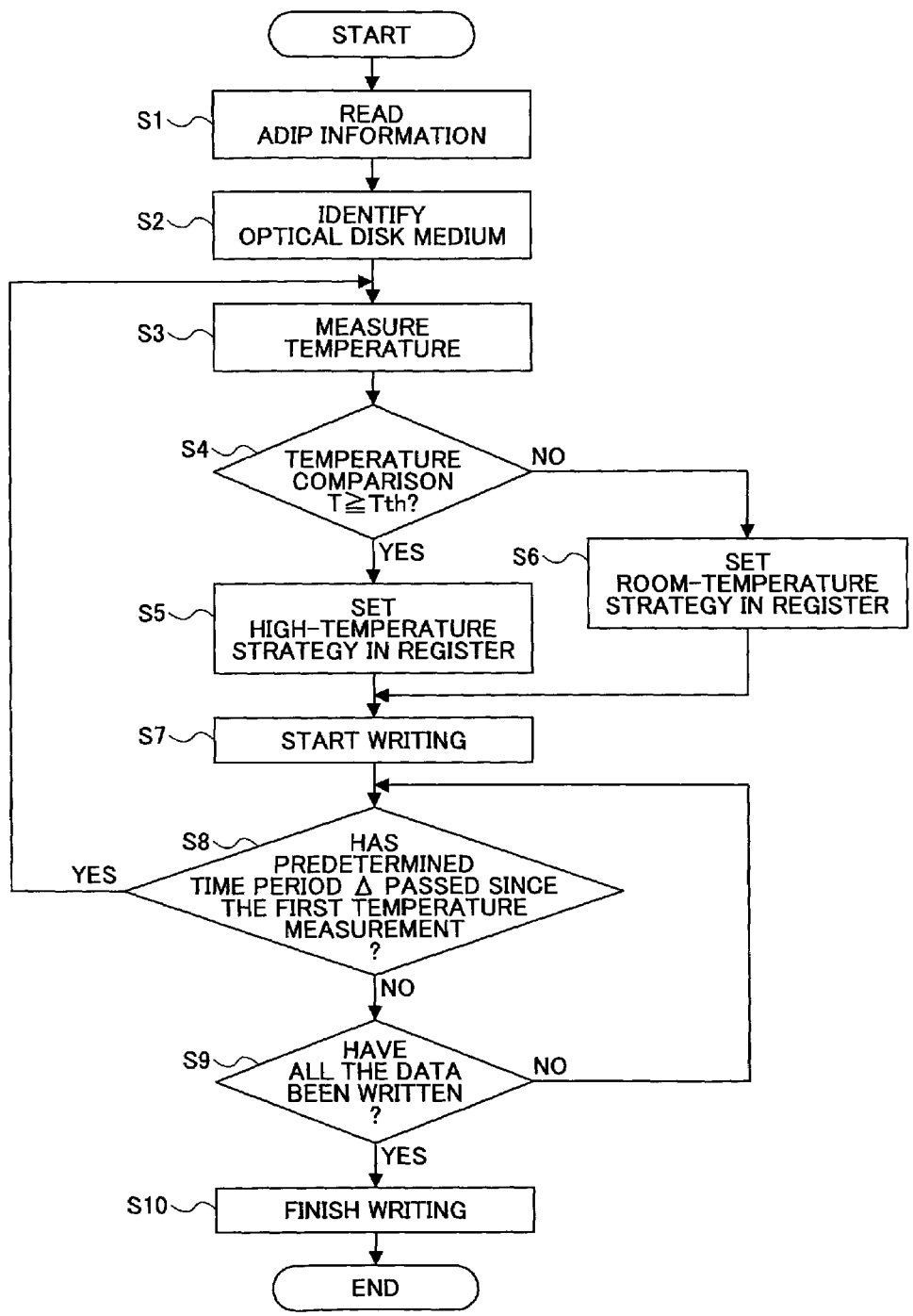
FIG. 9 is a flowchart showing the operations carried out by the optical disk recording and reproducing apparatus according to an embodiment of the invention.

FIG. 9 is a flowchart of the recording operations carried out by the optical recording and reproducing apparatus 1 according to an embodiment of the invention. First, when data are recorded in a phase-change optical disk D, the controller 14 reads the ADIP medium information from the optical disk D (Step S1). Then, the controller 14 identifies the optical disk D, specifying the manufacturer/vendor, the type of the disk, or the disk revision, based on the ADIP information (step S2). Then, the controller 14 acquires the temperature T at the surface of the optical recording and reproducing apparatus 1 measured by the temperature sensor 18 (step S3). In the subsequent steps, the erase power is controlled based on the measured temperature T so as to adjust $\epsilon$ H within the prescribed range.

It is determined whether the measured temperature T is higher than or equal to the prescribed temperature Tth (40° C. in this example) (step S4). If the measured temperature T is higher than or equal to Tth (YES in S4), high-temperature recording strategy is set in the register 15 (S5). As an example of the recording strategy, $\epsilon$ H, which is greater than the ordinary level $\epsilon$ 0 determined at room temperature, is set in the register 15. This step is referred to as the pulse amplitude control step.

If the measured temperature T is lower than the threshold level Tth (NO in S4), the ordinary recording strategy (i.e., $\epsilon$ 0) for room temperature is set in the register 15 (step S6). Then, the emission waveform is controlled by the multipulse generator 16 and the power controller 17 according to the recording strategy set in the register 15, and the writing operation in the optical disk D is started (step S7). The environmental temperature is likely to increase due to heat generation in the optical pickup unit and the LSI circuits after the writing operation is actually started. Accordingly, the temperature is measured on the surface of the optical recording and reproducing apparatus 1 at a prescribed time interval $\Delta$ (for example, every 1 minute). To be more precise, it is determined whether a prescribed time period $\Delta$ has passed (step S8). If YES in S8, the process returns to step S3 to measure the temperature again, and the steps S4 through S7 are repeated. If all the data have been written in the optical disk D (YES in step S9), the writing operation terminates (step S10)

In this embodiment, it is regarded that the internal temperature of the optical pickup 5 is equivalent to the surface temperature of the optical recording and reproducing apparatus 1. FIG. 10 is a table showing temperatures measured for five different optical recording and reproducing apparatuses (optical disk drives) at various different spots of the apparatus. Temperature is measured in the surrounding atmosphere, at the bottom of the apparatus (optical disk drive), at the disk surface, at the top face of the apparatus, and by the thermistor (temperature sensor). Since the differences among the disk surface temperature (at the surface of the optical disk D), the drive surface temperature (at the surface of the optical recording and reproducing apparatus 1) and the thermistor temperature (sensed by the temperature sensor 18) are within about 3 degrees, these temperatures are regarded as almost the same temperature in this embodiment. Accordingly, the pulse control in response to the temperature change is not limited to the above-described example in which the temperature at the surface of the optical recording and reproducing apparatus 1 is used as the basis of the pulse control. For example, the temperature directly measured by the thermistor may be used. Alternatively, the surrounding atmospheric temperature may be used. In the latter case, correlation between the atmospheric temperature and the surface temperature of the optical disk drive (optical recording and reproducing apparatus) 1 is defined in advance, and the pulse amplitude is controlled in response to the change in the atmospheric temperature surrounding the optical recording and reproducing apparatus 1.

This patent application is based on and claims the benefit of the earlier filing dates of Japanese Patent Application No. 2003-395916 filed Nov. 26, 2003, and Japanese Patent Application No. 2003-406337, filed Dec. 4, 2003, the entire contents of which are hereby incorporated by reference.

The invention claimed is:

1. An optical data recording apparatus comprising: a pulse generator configured to generate a sequence of one or more short pulses used to record data in a phase-change optical recording medium; a temperature sensor configured to detect a temperature at a prescribed spot of the optical data recording apparatus; and a pulse amplitude controller configured to control the amplitude of said short pulses based on the detected temperature, wherein the pulse amplitude controller is configured to control a ratio "$\epsilon$" of an erase power to a write power of the sequence of short pulses optimized at room temperature based on the detected temperature.

2. The optical data recording apparatus of claim 1, wherein the pulse amplitude controller is configured to increase the $\epsilon$ value when the detected temperature exceeds a prescribed temperature (Tth) at which $\epsilon$ control is started.

3. The optical data recording apparatus of claim 2, wherein when the detected temperature exceeds the prescribed temperature (Tth), the pulse amplitude controller is configured to change the $\epsilon$ value to $\epsilon$ H that is greater than a reference ratio $\epsilon$ 0, where the reference ratio $\epsilon$ 0 is a ratio of the erase power to the write power optimized at a reference temperature lower than the prescribed temperature Tth.

4. The optical data recording apparatus of claim 3, wherein when the detected temperature is 50° C. and the reference temperature is 30° C., then the pulse amplitude controller is configured to change the $\epsilon$ value to the $\epsilon$ H level so as to satisfy the relation $\epsilon$ 0<$\epsilon$ H<1.15*$\epsilon$ 0.

5. The optical data recording apparatus of claim 1, wherein the temperature sensor is configured to detect the temperature at the prescribed spot of the optical data recording apparatus at a prescribed time interval.

6. An optical data recording method for recording data in a phase-change optical recording medium using a sequence of one or more short pulses, comprising the steps of: detecting a temperature at a prescribed spot around the optical recording medium; controlling an amplitude of the short pulses in response to the detected temperature; and recording data in the optical recording medium using the sequence of the amplitude-controlled short pulses, wherein the controlling step includes controlling a ratio $\epsilon$ of an erase power to a write power of the short pulses optimized at room temperature in response to the detected temperature.

7. The optical data recording method of claim 6, wherein the controlling step includes increasing the $\epsilon$ value when the detected temperature exceeds a prescribed temperature (Tth) at which $\epsilon$ control is started.

8. The optical data recording method of claim 7, further comprising the step of: setting a reference ratio $\epsilon$ 0 that is a ratio of the erase power to the write power optimized at a reference temperature lower than the prescribed temperature (Tth); wherein the controlling step includes changing the $\epsilon$ value to $\epsilon$ H that is greater than the reference ratio $\epsilon$ 0 when the detected temperature exceeds the prescribed temperature (Tth).

9. The optical data recording method of claim 8, wherein when the detected temperature is 50° C. and the reference temperature is 30° C., then the controlling step includes changing the $\epsilon$ value to the $\epsilon$ H level so as to satisfy the relation $\epsilon$ 0<$\epsilon$ H<1.15*$\epsilon$ 0.

10. The optical data recording method of claim 9, wherein the temperature detecting step includes detecting the temperature at the prescribed spot of the optical data recording apparatus at a prescribed time interval.

* * * * *